US012125659B2

(12) United States Patent
Pralle et al.

(10) Patent No.: US 12,125,659 B2
(45) Date of Patent: Oct. 22, 2024

(54) MICROCHANNEL PLATE IMAGE INTENSIFIERS AND METHODS OF PRODUCING THE SAME

(71) Applicant: SiOnyx, LLC, Beverly, MA (US)

(72) Inventors: Martin U. Pralle, Wayland, MA (US); Christopher Vineis, Winchester, MA (US)

(73) Assignee: SIONYX, LLC, Beverly, MA (US)

( * ) Notice: Subject to any disclaimer, the term of this patent is extended or adjusted under 35 U.S.C. 154(b) by 0 days.

(21) Appl. No.: 17/888,168

(22) Filed: Aug. 15, 2022

(65) Prior Publication Data

US 2023/0051953 A1 Feb. 16, 2023

Related U.S. Application Data

(60) Provisional application No. 63/233,727, filed on Aug. 16, 2021.

(51) Int. Cl.
*H01J 31/50* (2006.01)

(52) U.S. Cl.
CPC ..... *H01J 31/507* (2013.01); *H01J 2231/5016* (2013.01)

(58) Field of Classification Search
None
See application file for complete search history.

(56) References Cited

U.S. PATENT DOCUMENTS 5,378,960 A * 1/1995 Tasker .................. H01J 49/025
313/104
9,355,828 B1 5/2016 Smith et al.
10,734,184 B1 * 8/2020 Smith .................. H01J 31/505
2005/0106983 A1 * 5/2005 Losue .................. H01J 31/507
445/23

(Continued)

FOREIGN PATENT DOCUMENTS

WO 2020257239 A1 12/2020

OTHER PUBLICATIONS

International Search Report and Written Opinion of the International Searching Authority, PCT/US2022/040352, dated Dec. 30, 2022.

*Primary Examiner* — Jennifer D Bennett
*Assistant Examiner* — Erin R Garber
(74) *Attorney, Agent, or Firm* — Troutman Pepper Hamilton Sanders LLP

(57) ABSTRACT

Image intensifier systems incorporating a microchannel plate (MCP) and methods for producing the same are disclosed. In some examples, a device is disclosed that includes a first substrate having a radiation-receiving first surface and an opposed second surface through which electromagnetic radiation is transmitted. A second substrate is coupled to the first substrate to define a vacuum cavity therebetween. An electron-emitting photocathode is disposed within the vacuum cavity for generating electrons from electromagnetic radiation transmitted through the second surface. A microchannel plate is disposed within the vacuum cavity and defines microchannels extending from an input end to an output end. Each of the microchannels is configured to generate electrons in response to an electron generated by the photocathode being received through the input end of the respective microchannel. A phosphorescent layer also is disposed within the vacuum cavity and adjacent the output ends of the microchannels of the microchannel plate.

44 Claims, 8 Drawing Sheets

(56) References Cited

U.S. PATENT DOCUMENTS

| | | | | |
|---|---|---|---|---|
| 2006/0081770 | A1* | 4/2006 | Buchin | H01J 31/507<br>250/214 VT |
| 2009/0315443 | A1 | 12/2009 | Sullivan et al. | |
| 2009/0321633 | A1* | 12/2009 | Blick | H01J 1/32<br>250/493.1 |
| 2011/0095177 | A1* | 4/2011 | Giannakopulos | H01J 49/025<br>250/281 |
| 2016/0233045 | A1* | 8/2016 | Hua | G02B 17/086 |
| 2019/0164715 | A1* | 5/2019 | Burnsed | H01J 31/506 |
| 2019/0164733 | A1 | 5/2019 | Burnsed et al. | |
| 2021/0020544 | A1* | 1/2021 | Park | H01L 21/486 |
| 2022/0320163 | A1* | 10/2022 | Mun | H01L 27/14685 |

* cited by examiner

MICROCHANNEL PLATE IMAGE INTENSIFIERS AND METHODS OF PRODUCING THE SAME

This application claims priority to U.S. Provisional Patent Application No. 63/233,727, filed Aug. 16, 2021, which is incorporated by reference herein in its entirety.

FIELD

The present teachings generally relate to image intensifiers incorporating a microchannel plate (MCP) and methods of manufacturing the same.

BACKGROUND

Image intensifiers have been used in devices such as night-vision goggles to allow a user to view low light-level scenes by converting the limited incoming photons from the scene into electrons, amplifying those electrons, and then converting the electrons back into photons of light that are visible to the user's naked eye. In particular, the photons from a low-level light source, and/or reflected from an object, conventionally enter an objective lens, which focuses an image into a photocathode that releases electrons via the photoelectric effect as the incoming photons hit the photocathode. These electrons are then accelerated via a high-voltage potential into a microchannel plate (MCP) typically having thousands of tiny conductive microchannels. As high-energy electrons strike the conductive microchannels (which are typically tilted at an angle away from normal to encourage collisions with the microchannels' inner surfaces), the interaction causes the release of additional electrons in a process commonly referred to as secondary cascaded emission. In this manner, where only one or two electrons may enter a microchannel of the MCP, thousands of electrons may emerge. Upon exiting the MCP, another (lower) charge differential typically accelerates the secondary electrons toward a phosphor screen at the other end of the intensifier, which releases a photon for every electron. These photons, which typically are green due to the human eye's improved ability to distinguish intensity differences of green light, are conventionally transmitted from the phosphor via a fiber optic bundle to an eyepiece lens for viewing by the user.

SUMMARY

Image intensifier systems incorporating MCPs and methods of producing the same are provided herein. In various aspects, the present teachings provide image intensifier devices incorporating MCPs having increased robustness relative to those of conventional systems and/or image intensifier devices that may be manufactured using high-volume, parallel wafer-level processing methods. Conventional MCPs generally contain a high weight fraction of lead oxide (PbO) in order to provide the electrical characteristics necessary to generate electrons from the photons received from the photocathode. The applicant has discovered that such MCPs incorporating high levels of PbO, however, may be prone to failure due to the brittle nature of the bulk PbO material. Moreover, because extreme care must be taken during manufacturing of such devices, conventional image intensifiers are generally produced individually in order to prevent breakage of the MCP, thereby increasing cost and/or decreasing throughput.

Additionally or alternatively, certain aspects of the present teachings provide image intensifier systems and methods of producing the same having an improved ability to produce digital images of the scene under observation. As described herein, certain aspects of the present teachings provide an imaging array intimately arranged with respect to the phosphorescent layer so as to directly convert the photons generated thereby into a digital image, while eliminating the conventional use of a fiber optic bundle necessary to transfer the analog image produced by the phosphor to an eyepiece for viewing by the user.

In accordance with various exemplary aspects of the present teachings, an optoelectronic device is provided, the device comprising a first substrate having a radiation-receiving surface configured to receive electromagnetic radiation and an opposed surface through which the received electromagnetic radiation can be transmitted. A second substrate may be coupled to the first substrate so as to define a vacuum cavity therebetween, the second substrate comprising an imaging array. An electron emitting photocathode may be disposed within the vacuum cavity for generating electrons from electromagnetic radiation transmitted through the second surface of the first substrate. Additionally, a MCP, which may at least partially be disposed within the vacuum cavity, may define a plurality of microchannels extending from an input end to an output end, wherein each of the plurality of microchannels is configured to generate a plurality of electrons in response to at least one electron generated by the photocathode being received through the input end of the respective microchannel. The optoelectronic device may also comprise a phosphorescent layer disposed within the vacuum cavity and adjacent the output ends of the plurality of microchannels of the MCP, wherein the imaging array is configured to image one or more photons generated by the phosphorescent layer in response to the plurality of electrons transmitted by the outlet ends of the plurality of microchannels.

In various aspects, the imaging array may comprise a plurality of photodiodes, commonly referred to as pixels, formed in the second substrate. In some related aspects, each of the plurality of photodiodes may be associated with one of the plurality of microchannels. The plurality of microchannels of the MCP and the photodiodes can have a variety of configurations relative to one another. In some aspects, for example, each of the plurality of photodiodes may be aligned with a respective, individual microchannel of the microchannel plate, such that there is a one-to-one correlation between each individual microchannel of the MCP and each photodiode. In certain aspects, there is no correlation between each individual microchannel and each individual photodiode such that multiple microchannels are associated with a single photodiode or multiple photodiodes are associated with a single microchannel, and other permutations can also be used. In certain aspects, the plurality of microchannels of the MCP and the plurality of photodiodes may be formed in a hexagonal array.

The first substrate can have a variety of configurations, though in certain aspects, is generally configured to transmit light therethrough from a radiation-receiving surface to a radiation-transmitting surface. In certain aspects, the first substrate may comprise glass. For example, as discussed with respect to example methods of production below, the first substrate may represent a portion of a glass cover wafer that is utilized during wafer level processing.

The photocathode can be any material known in the art or hereafter developed for converting the electromagnetic radiation (e.g., photons) transmitted from the second surface of the first substrate into electrons. By way of non-limiting example, the photocathode may comprise gallium arsenide.

In certain aspects, the microchannel plate may comprise a silicate glass having an electron-emitting semiconducting layer deposited on a surface thereof. By way of non-limiting example, the silicate glass comprises silicon dioxide, borosilicate, or aluminosilicate. In certain aspects, the silicate glass can have a concentration of lead oxide less than about 1%. For example, the electron-emitting semiconducting layer deposited on a surface of the silicate glass may comprise a thin film having a composition different from the silicate glass. Non-limiting examples of such thin films compositions include lead oxide, cesium iodide, gallium arsenide, cadmium telluride, cadmium sulfide, indium phosphide, indium antimonide, germanium, silicon, or other group II-VI, group III-V, or group IV semiconductor. The thin film may be formed on the bulk silicate glass in a variety of manners. By way of non-limiting example, the electron-emitting semiconducting layer may be deposited via atomic layer deposition, chemical vapor deposition, reactive ion deposition, or reactive vapor evaporation.

The phosphorescent layer can emit photons of a variety of wavelengths in accordance with the present teachings. By way of non-limiting example, the phosphorescent layer may be configured to generate photons having a wavelength in a range from about 500 nm to about 565 nm.

In various aspects, the second substrate containing the imaging array can be disposed in intimate contact with the phosphorescent layer, for example, to reduce optical cross-talk between photons generated by the phosphorescent layer from electrons exiting adjacent microchannels of the MCP. For example, in certain aspects, the second substrate may be disposed within a range of about 0.1 to 10 microns of the phosphorescent layer. Additionally or alternatively, in certain aspects, a micro-lens array disposed between the phosphorescent layer and the imaging array. In certain aspects, a micro-lens array may additionally or alternatively be associated with the radiation-receiving surface of the first substrate for focusing light incident thereon. In some aspects, the second substrate may be in contact with the phosphorescent layer.

The vacuum cavity may exhibit a variety of pressures substantially below atmospheric pressure. By way of example, in certain aspects, the vacuum cavity may exhibit a pressure less than about $1\times10^{-4}$ Torr. For example, the pressure may be less than or equal to about $1\times10^{-6}$ Torr. Additionally, in certain aspects, a vacuum gettering material may be disposed within the vacuum cavity to maintain the low pressure, for example, by scavenging gases therewithin.

The imaging array can comprise a variety of configurations. By way of non-limiting example, the imaging array can comprise a CMOS imaging array. In some aspects, for example, the imaging array may comprise a plurality of backside-illuminated pixels such that photons generated by the phosphorescent layer and detected by a pixel need not first pass by circuitry associated with pixel.

As noted above, systems and methods described herein can in some aspects provide processing of devices at the wafer level. For example, such a wafer may comprise a plurality of optoelectronic devices described herein, wherein the vacuum cavity of each of the plurality of optoelectronic devices may be separated from one another. Such optoelectronic devices may then be cut from the wafer. Relative to conventional image intensifier manufacturing techniques that conventionally produce a single image intensifier at a time, many optoelectronic devices in accordance with various aspects of the present teachings may be produced on a single wafer, thereby increasing throughput and/or decreasing cost per device due to the parallel processing.

In accordance with certain aspects of the present teachings, a device is provided comprising a first substrate having a radiation-receiving surface configured to receive electromagnetic radiation and an opposed second surface through which the received electromagnetic radiation can be transmitted. A second substrate is coupled to the first substrate so as to define a vacuum cavity therebetween. An electron emitting photocathode is disposed within the vacuum cavity for generating electrons from electromagnetic radiation transmitted through the second surface of the first substrate. Additionally, a microchannel plate is at least partially disposed within the vacuum cavity, the microchannel plate defining a plurality of microchannels extending from an input end to an output end, wherein the microchannel plate comprises a silica glass having an electron emitting semiconducting layer deposited on the surface and configured to generate a plurality of electrons in response to at least one electron generated by the photocathode being received through the input end of the respective microchannel. Additionally, a phosphorescent layer may be disposed within the vacuum cavity and adjacent the output ends of the plurality of microchannels of the microchannel plate, wherein the phosphorescent layer is configured to generate one or more photons for transmission into the second substrate in response to receiving the plurality of electrons transmitted by the outlet end of the plurality of microchannels.

In accordance with certain aspects of the present teachings, a device is provided comprising a first substrate having a radiation-receiving surface configured to receive electromagnetic radiation and an opposed second surface through which the received electromagnetic radiation can be transmitted. A second substrate is coupled to the first substrate so as to define a vacuum cavity therebetween. An electron emitting photocathode is disposed within the vacuum cavity for generating electrons from electromagnetic radiation transmitted through the second surface of the first substrate. Additionally, a microchannel plate is at least partially disposed within the vacuum cavity, the microchannel plate defining a plurality of microchannels extending from an input end to an output end, wherein the microchannel plate comprises a silica glass having an electron emitting semiconducting layer deposited on the surface and configured to generate a plurality of electrons in response to at least one electron generated by the photocathode being received through the input end of the respective microchannel. An array of photodiodes is disposed beneath the output end of the microchannel plate such that the plurality of the electrons emitted from the microchannel plate are collected by the array of photodiodes. The plurality of photodiodes, commonly understood as a focal plane array, include a passivation coating on the surface of the photodiodes. In one example of the present teachings, this passivation coating shall be thin with a total thickness of less than 50 nm so as to allow tunneling of the electrons through the passivation layer and into the photodiode. In another example of the present teachings, this passivation coating shall be less than 30 nm. In another example of the present teachings, this passivation coating shall be less than 15 nm. It is understood that the passivation coating is a barrier for electron injection into the photodiodes and that the thinner the passivation coating, this barrier is reduced.

In accordance with certain aspects of the present teachings, the electrons that tunnel through the passivation and into the photodiode are accumulated in the photodiode. The accumulated electrons can be read out by the image sensor circuit so as to create a digital image.

In various aspects of the current teachings, the passivation coating on a surface of a backside illuminated photodiode array, or more commonly referred to as an imaging array, is comprised of a dielectric material. Non-limiting examples of such passivation thin films include silicon oxide, silicon nitride and silicon oxi-nitride. In other aspects of the current teachings, this passivation coating is comprised of a low k (dielectric constant) dielectric material. Non-limiting examples of such passivation thin films include hafnium oxide, aluminum oxide, and hafnium aluminum oxide.

Methods of producing image intensifiers are also provided herein. For example, in accordance with certain example aspects of the present teachings, a method of manufacturing is provided, the method comprising disposing a plurality of electron emitting photocathodes between a first wafer and a MCP defining a plurality of microchannels extending therethrough. A plurality of phosphorescent crystals may or may not also be disposed between the MCP and a second wafer. The second wafer may be bonded to the first wafer (e.g., directly or indirectly) to form a plurality of vacuum cavities therebetween such that each of the plurality of vacuum cavities comprises at least one of the plurality of photocathodes, a plurality of microchannels of the microchannel plate, and at least one phosphorescent crystal.

The first and second wafers may be bonded to each other in a variety of manners so as to form a plurality of vacuum cavities therebetween. For example, in certain aspects, bonding the second wafer to the first wafer may comprise bonding each of the first and second wafers to opposed sides of the MCP.

The first and second wafers can be bonded to one another under a variety of processing conditions. By way of example, the first and second wafers may be bonded to one another within a processing chamber exhibiting a pressure less than about $1\times10^{-4}$ Torr. For example, the first and second wafers are bonded to one another within a processing chamber such that the vacuum cavities exhibit a pressure less equal to or than about $1\times10^{-6}$ Torr when sealed.

Additionally, in certain aspects, the first and second wafers can be bonded to one another at a variety of temperatures. For example, in certain aspects, the first and second wafers may be bonded within a processing chamber exhibiting a temperature in a range of about 250 C. to about 450 C.

In certain aspects, bonding may comprise at least one of glass frit bonding, anodic bonding, surface modified bonding, and eutectic solder bonding.

The vacuum pressures described herein can helped be maintained in a variety of manners. By way example, in certain aspects the method may further comprise disposing a plurality of vacuum gettering materials between the first and second wafers such that at least one of the plurality of vacuum gettering materials is sealed within each vacuum cavity. Additionally or alternatively, the method may further comprise pre-baking of the materials prior to bonding the first and second wafers so as to eliminate outgassing.

As noted above, methods described herein can in some aspects provide for parallel processing of devices within a single wafer. For example, after bonding the first and second wafer, the devices formed therein may be excised from the bonded wafer. For example, the bonded first and second wafers may be diced into a plurality of dies, wherein each die comprises at least one vacuum cavity.

In various aspects, the second wafer may comprise an imaging array comprising a plurality of photodiodes. For example, in certain aspects, the method may further comprise aligning the plurality of photodiodes with at least one of the plurality of microchannels prior to bonding the first and second wafers. Each of the plurality of photodiodes may be aligned with a respective, individual microchannel of the microchannel plate, for example.

As discussed above, an MCP suitable for use in accordance with the present teachings may have a variety of configurations. For example, in certain aspects, the microchannel plate may comprise a silicate glass having an electron-emitting semiconducting layer deposited on the surface. Non-limiting examples of silicate glasses include silicon dioxide, borosilicate, or aluminosilicate and non-limiting examples of such electron emitting semiconducting layers include lead oxide, cesium iodide, gallium arsenide, cadmium telluride, cadmium sulfide, indium phosphide, indium antimonide, germanium, silicon, or other group II-VI, group III-V, or group IV semiconductor. The thin film may be formed on the bulk silicate glass in a variety of manners. By way of non-limiting example, the electron-emitting semiconducting layer may be deposited via atomic layer deposition, chemical vapor deposition, reactive ion deposition, or reactive vapor evaporation.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

Whereas conventional image intensifiers typically utilize MCPs containing brittle, PbO-based glass such that image intensifiers must be produced individually in order to prevent breakage, various aspects of the present teachings provide methods of producing image intensifier devices incorporating MCPs using high-volume parallel processing techniques on the wafer level. Additionally or alternatively, certain aspects of the present teachings provide methods of producing optoelectronic imaging devices having an improved ability to produce digital images of the scene under observation.

Figure 1:
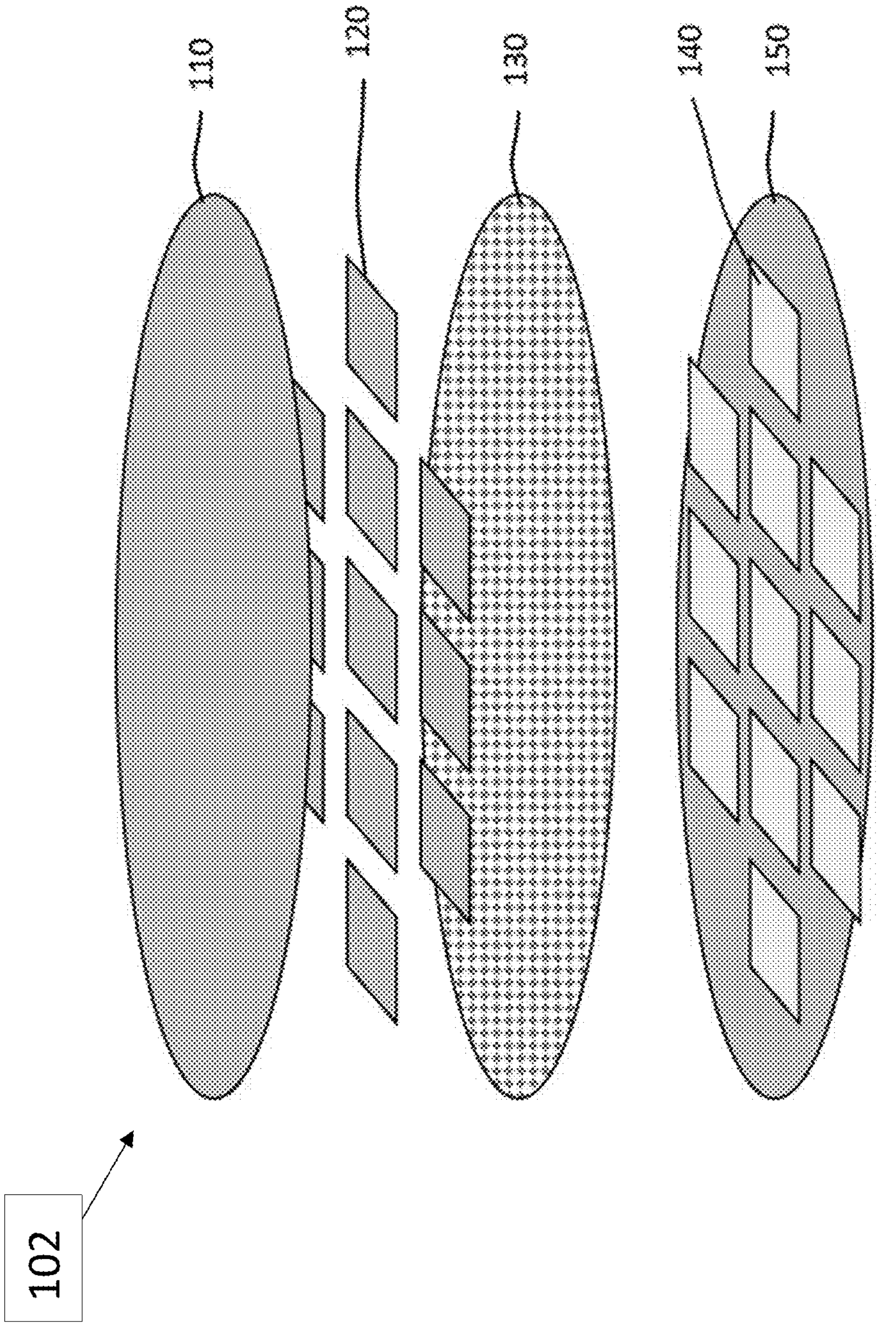
FIG. 1, in a schematic diagram, illustrates an exemplary method for producing an image intensifier device in accordance with various aspects of the present teachings.

With reference first to FIG. 1, an exemplary method for producing an image intensifier device in accordance with various aspects of the present teachings is schematically depicted. As shown, a front wafer 110 and a back wafer 150 may be provided which may be bonded to one another directly or indirectly such that photocathodes 120, a glass wafer MCP 130, and phosphorescent crystals 140 are disposed therebetween. The wafers 110 and 150 and MCP 130 can have a variety of dimensions but in some aspects are of the size commonly referred to in the semiconductor industry as 200 mm (8") wafers or larger.

The front wafer 110 can comprise a variety of materials but is generally configured to receive and transmit ambient electromagnetic radiation therethrough. By way of non-limiting example, the front wafer 110 can comprise a glass cover. Though not shown, it will be appreciated in light of the present teachings that the front wafer 110 may comprise a micro-lens array, e.g., formed on a radiation receiving surface effective to focus radiation incident thereon.

The plurality of photocathodes 120 are disposed between the front wafer 110 and the MCP wafer 130 and are generally configured to generate one or more electrons in response to electromagnetic radiation received thereby. A person skilled in the art will appreciate that the photocathodes 120 may comprise a variety of materials known or hereafter developed and modified in accordance with the present teachings. In certain embodiments, the photocathodes 120 may comprise gallium arsenide, by way of non-limiting example. As shown, the plurality of photocathodes 120 may be generally disposed between the front wafer 110 and MCP wafer 130 and separated from one another (e.g., there is a gap between adjacent photocathodes 120 of the depicted array) and may comprise a variety of surface areas depending, for example, on the desired size of the image intensifier device as discussed otherwise herein.

As shown, the MCP wafer 130 is generally disposed between the photocathodes 120 and the phosphorescent crystals 140. The MCP wafer 130 can have a variety of configurations, but generally comprises a plurality of microchannels extending from the upper surface to the lower surface as shown in FIG. 1, with each microchannel being configured to generate a plurality of electrons due to secondary cascaded emission in response to electrons being received from the photocathodes 120. The microchannels can have a variety of configurations but in some example aspects may be micron-sized (e.g., having cross-sectional dimensions in a range from about 2 microns to about 40 microns) and be disposed at a bias angle of about 5° to about 13° relative to the major surface of the photocathodes 120 such that electrons generated are more likely to impinge on a sidewall of the microchannels.

Whereas conventional image intensifiers utilize PbO-based MCPs that are sufficiently fragile such that manufacturing of an image intensifier must be done individually (e.g., sufficiently thin PbO-based MCPs cannot be generated as 200 mm wafers without significant risk of breakage), certain aspects of the present teachings provide for the use of less fragile bulk materials having an electron-emitting semiconducting layer deposited on the surface of the microchannels. In various aspects, the bulk material may comprise a silicate glass (e.g., silicon dioxide, borosilicate, aluminosilicate) containing less than about 1% PbO, while the electron-emitting semiconductor layer may comprise one or more of lead oxide, cesium iodide, gallium arsenide, cadmium telluride, cadmium sulfide, indium phosphide, indium antimonide, germanium, silicon, or other group II-VI, group III-V, or group IV semiconductor, all by way of non-limiting example. Example techniques for forming the electron-emitting semiconducting layer on the surfaces of the MCP wafer 130 include atomic layer deposition, chemical vapor deposition, reactive ion deposition, or reactive vapor evaporation, by way of example. An article by O'Mahony et al. entitled "Atomic layer deposition of alternative glass microchannel plates" published in J. Va. Sci. Technol. A 34(1) (January/February 2016), which is incorporated by reference herein in its entirety, describes an example method that can be modified in accordance with the present teachings for producing an MCP wafer 130. Unlike a conventional PbO-based MCP, the MCP wafer 130 can be reliably manufactured as a 200 mm wafer with less likelihood of breakage, for example, when dicing the assembled, bonded wafers as discussed below.

As shown, the plurality of phosphorescent crystals 140 are disposed between the MCP wafer 130 and the back wafer 150 and are generally configured to generate one or more photons in response to the electrons received thereby. A person skilled in the art will appreciate that the phosphorescent crystals 140 may comprise a variety of materials known or hereafter developed and modified in accordance with the present teachings. In certain embodiments, the phosphorescent crystals 140 may be configured to emit photons of a variety of wavelengths, though in some example aspects may emit green light having a wavelength in the range from about 500 nm to about 565 nm as with conventional image intensifiers, for example, used in night vision goggles. As shown, the plurality of phosphorescent crystals 140 may be generally disposed between the MCP wafer 130 and back wafer 150 and separated from one another (e.g., there is a gap between adjacent phosphorescent crystals 140 of the depicted array) and are generally aligned with the photocathodes 120.

The back wafer 150 can comprise a variety of materials, but is generally configured to receive photons generated by the phosphorescent crystals 140. As discussed below, the back wafer may comprise a glass substrate, for example, through which the photons may be transmitted (e.g., to a downstream viewer and/or sensor via a fiber optic bundle). Alternatively, in some example aspects, the back wafer 150 itself may comprise an imaging array configured to convert the photons generated by the phosphorescent crystals 140 into a digital image, for example.

With the various layers arranged as in FIG. 1, further processing (e.g., bonding) may take place in a processing chamber 102 that is evacuated to pressures substantially less than atmospheric pressure. By way of example, the processing chamber 102 may be evacuated to a pressure less than about $1\times10^{-4}$ Torr (e.g., less than or equal to about $1\times10^{-6}$ Torr) to provide the necessary internal pressure to the microchannels for secondary cascaded emission when the layers are bonded to one another. In particular, the front wafer 110 may be bonded to one surface of the MCP 130 and the back wafer 150 may be bonded to the other surface of the MCP 130 within the evacuated processing chamber 102 such that one of the photocathodes 120 and phosphorescent crystals 140 and a plurality of the microchannels of the MCP wafer 130 are sealed within a vacuum cavity defined between the front and back wafers 110, 150 and the peripheral bond lines between the front and back wafers 110 and 150, respectively, and a portion of the MCP wafer 130. When bonding the MCP 130 between the front and back wafers 110, 150 as described above, it will be appreciated that the pressure within the vacuum cavity (and microchannels of the MCP 130) sealed thereby will be substantially at the pressure of the processing chamber 102.

In various aspects, further techniques can be employed to help provide and/or maintain the sufficiently low pressures required for the image intensifier operation. By way of example, in some aspects, each of the layers 110-150 can be pre-baked (e.g., to dry out, remove any solvents) to prevent outgassing. Additionally or alternatively, gettering materials can be provided within the vacuum cavity (as discussed below with reference to FIG. 4) to assist in scavenging gases once the vacuum cavity is sealed. Known gettering materials include, for example, metal alloys produced by SAES getters.

In addition to or alternatively to pre-baking, for example, in certain aspects, the various layers 110-150 may be bonded within processing chamber 102 maintained at a temperature in a range of about 250 C. to about 450 C. In various aspects, the temperature may be maintained at or above about 405° C. during the bonding process for a sufficient time to help ensure that the gettering material, if provided, is activated.

The front and back wafers 110, 150 can be bonded to the opposed surfaces of the MCP wafer 130 utilizing any technique known in the art or hereafter developed. By way of example, the various surfaces can be bonded to one another via glass frit bonding, anodic bonding, surface modified bonding, and eutectic solder bonding.

With a wafer so assembled and bonded as described above, the bonded wafers may be diced into a plurality of dies (e.g., image intensifier devices), each of which comprises at least one vacuum cavity sealed therewith. A traditional dicing saw may be utilized, for example, to cut the bonded layers between the vacuum cavities (e.g., along a bond line) so as to preserve the vacuum cavity within each image intensifier device formed within the wafers, though it will be appreciated by those skilled in the art that dicing may also be performed any other means known in the art (e.g., laser cutting). In some aspects, the front wafer 110 and MCP wafer 130 may be cut, with the cutline moving horizontally away from the vacuum cavity such that a shelf is formed on a surface of the back wafer 150. As will be appreciated by a person skilled in the art, such a shelf may provide a surface, for example, at which to provide electrical connections.

Though not shown in FIG. 1, it will also be appreciated by a person skilled in the art that one or more electrical contacts can be formed on one or more surfaces of the various layers (e.g., prior to bonding) so as to control the movement of electrons within the microchannels of the MCP wafer 130, for example. By way of non-limiting, electrical contacts comprising a nickel-chromium layer can be deposited on the input (upper) and output (lower) surfaces of the MCP wafer 130 so as to provide an electrical field that drives the generated electrons toward the output end of each microchannel.

Figure 2:
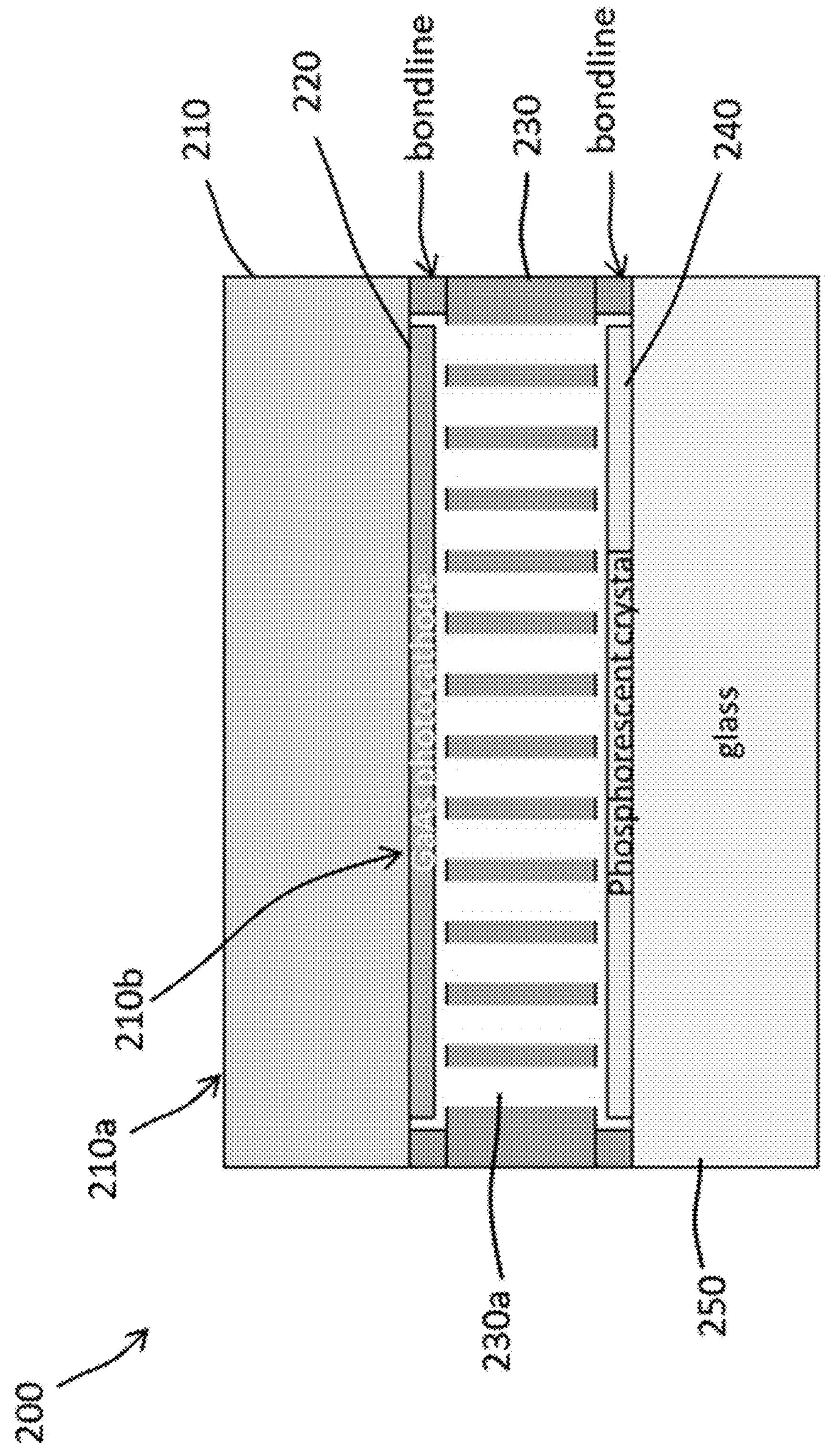
FIG. 2, in a schematic diagram, illustrates an exemplary image intensifier device produced according to method of FIG. 1 in accordance with various aspects of the present teachings.

With reference now to FIG. 2, a side view of an example image intensifier device 200, which may be diced from a bonded, assembled wafer according to the example method described above with respect to FIG. 1, is depicted. As shown in FIG. 2, the image intensifier device 200 comprises a front substrate 210 through which light can enter the device through the front surface 210*a*. Photons transmitted through the front substrate 210 and exiting the rear surface 210*b* impinge upon photocathode 220, thereby producing electrons that are preferably driven into an associated, aligned microchannel 230*a* of the MCP 230, which may generate additional electrons due to the secondary cascade emission. Such electrons are driven toward the phosphorescent layer 240, which is effective to generate one or more photons in response to the impingement of the electrons. As suggested in FIG. 2, the photons generated by the phosphorescent layer 240 may enter the back substrate 250 before being directed therefrom. In some embodiments, a microlens array may be formed on the upper surface 250*a* so as to focus the light generated by the phosphorescent layer 240 corresponding to each microchannel 230*a*, for example, into a corresponding optical fiber for transmission to a user and/or sensor coupled to the opposite end of the fiber bundle. As shown, a first bond line extends around the periphery of the vacuum cavity between the front substrate 210 and MCP 230 and a second bond line extends around the periphery of the vacuum cavity between the MCP 230 and the back substrate 250.

Figure 3:
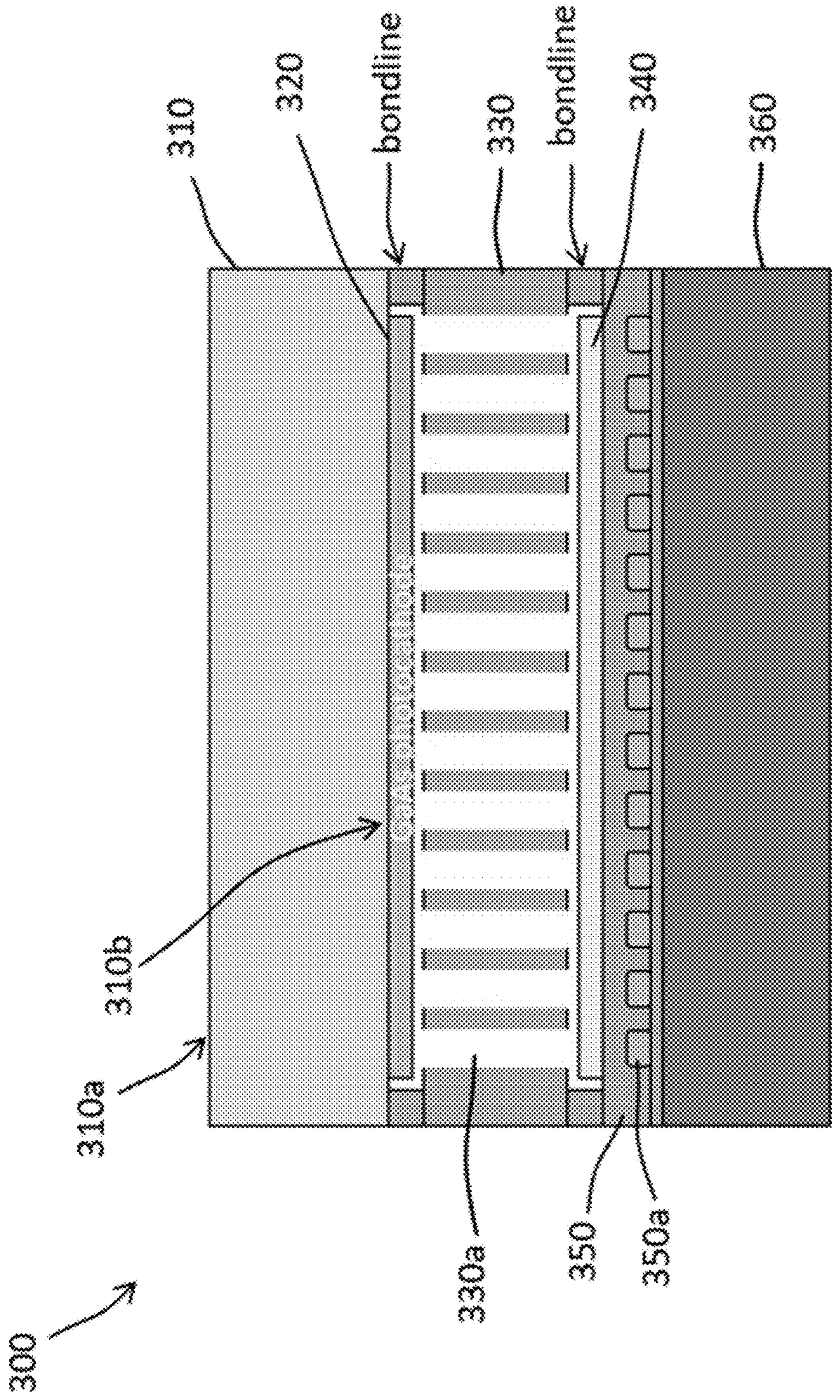
FIG. 3, in a schematic diagram, illustrates an exemplary side view of another image intensifier device produced according to method of FIG. 1 in accordance with various aspects of the present teachings.

With reference now to FIG. 3, another example image intensifier device 300 in accordance with various aspects of the present teachings is depicted. Image intensifier device 300 is similar to device 200 but differs in the back substrate 350 itself comprises an image sensor disposed on a carrier substrate 360 (e.g., part of a carrier wafer). For example, as shown in FIG. 3, the back substrate 350 comprises a plurality of photodiodes 350*a* arranged to generate an electrical signal from the photons generated by the phosphorescent layer 340. In certain aspects, the photodiodes 350*a* may be intimately arranged with respect to the phosphorescent layer 340 such that each photodiode 350*a* is configured to detect photons generated by the region of the phosphorescent layer 340 closest to each photodiode 350*a*. In certain aspects, for example, the back substrate 350 may be in direct contact with the phosphorescent layer 340. Additionally or alternatively, in some example aspects, photodiodes 350*a* may be formed within the back substrate 350 at a depth not to exceed 10 microns, for example, in a range of about 0.1 to about 10 microns. In some example, aspects, the phosphorescent layer 340 and back substrate 350 may be separated by a distance in a range of about 0.1 to about 10 microns. It will be appreciated in light of the present teachings that such intimate contact allows the photons generated by the phosphorescent layer 340 to be directly converted into a digital image, while eliminating the potential loss, expense, and bulkiness of the conventional use of a fiber optic bundle for delivery of an analog image produced by an image intensifier device to an eyepiece for viewing by the user.

The back substrate 350 with the image sensor can have a variety of configurations. By way of example, the back substrate 350 may comprise a plurality of complementary metal-oxide semiconductor (CMOS) imagers. While both front side illuminated (FSI) and backside illuminated (BSI) CMOS devices could be utilized in accordance with the present teachings, such CMOS imagers may be configured as BSI imagers such that the photodiodes 350*a* are disposed closely to the phosphorescent layer 340 and the light generated thereby does not need to pass by circuitry, for example, prior to reaching the junction as an FSI device.

Figure 5:
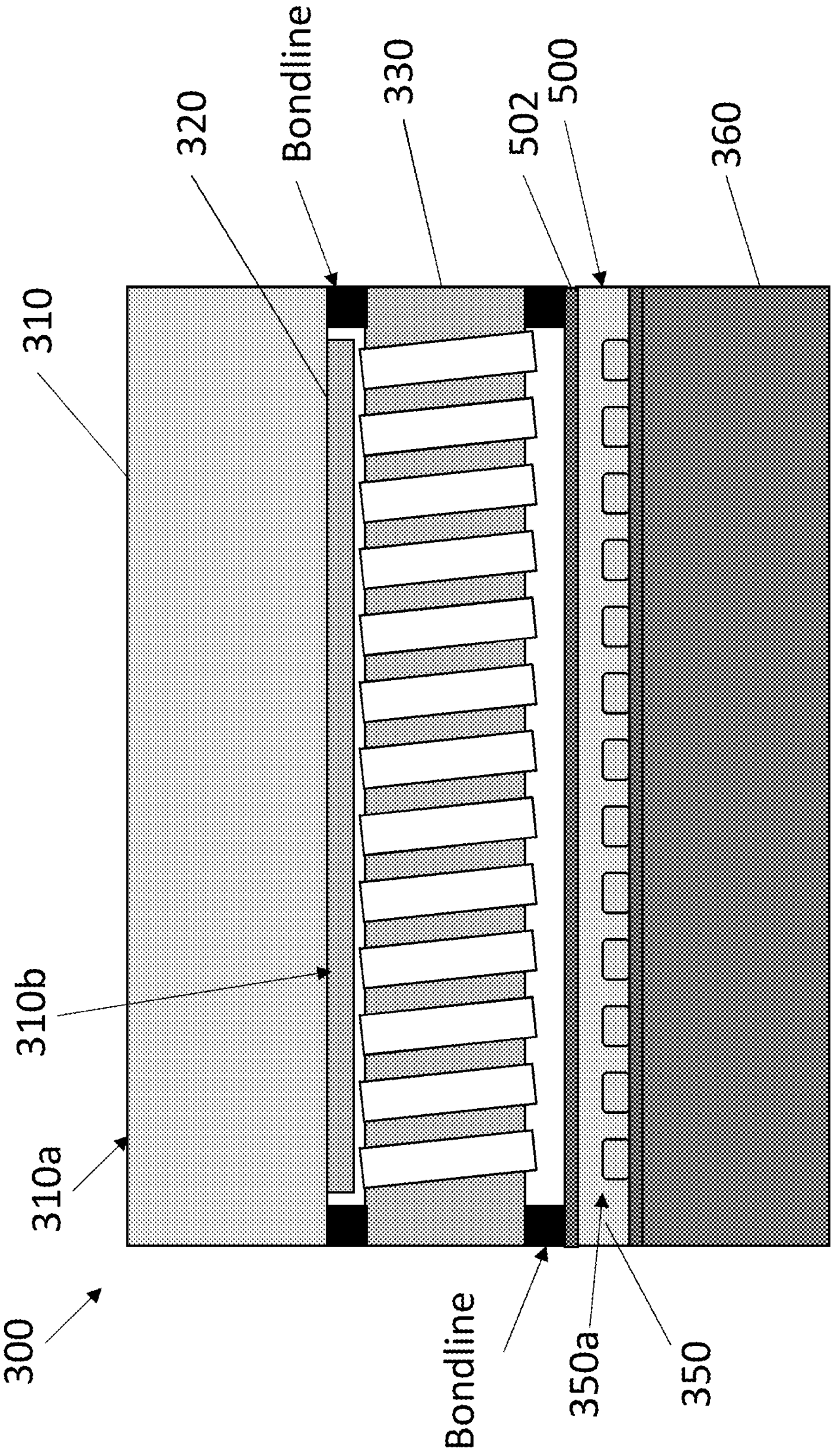
FIG. 5, in a schematic diagram, illustrates an exemplary side view of the image intensifier device of FIG. 3 with a BSI CMOS device and passivation coating.

Referring to FIG. 5, the image intensifier device 300 of FIG. 3 is illustrated with a BSI CMOS device 500 that includes the photodiodes 350*a*. In this example, the photodiodes 350*a*, also referred to in the art as a focal plan array, include a passivation coating 502 on a surface. In one example, the passivation coating 502 is relatively thin with a total thickness of less than 50 nm so as to allow tunneling of the electrons through the passivation coating 502 and into the photodiodes 350*a*. In other examples, the passivation coating 502 can be less than 30 nm or less than 15 nm. The passivation coating 502 is a barrier for electron injection into the photodiodes 350*a* and the thinner the passivation coating 502 the more this barrier is reduced, and there is thus an inverse relationship.

The passivation coating 502 on a surface of a BSI CMOS device 500 can include a dielectric material. Non-limiting examples of such passivation thin film dielectric materials include silicon oxide, silicon nitride, and silicon oxi-nitride. In other examples, the passivation coating 502 includes a low k (dielectric constant) dielectric material, such as hafnium oxide, aluminum oxide, and hafnium aluminum oxide, for example. The electrons that tunnel through the passivation coating 502 and into the photodiodes 350*a* are accumulated in the photodiode 350*a*. The accumulated electrons can be read out by an image sensor circuit of the BSI CMOS device 500 so as to create a digital image.

Figure 6:
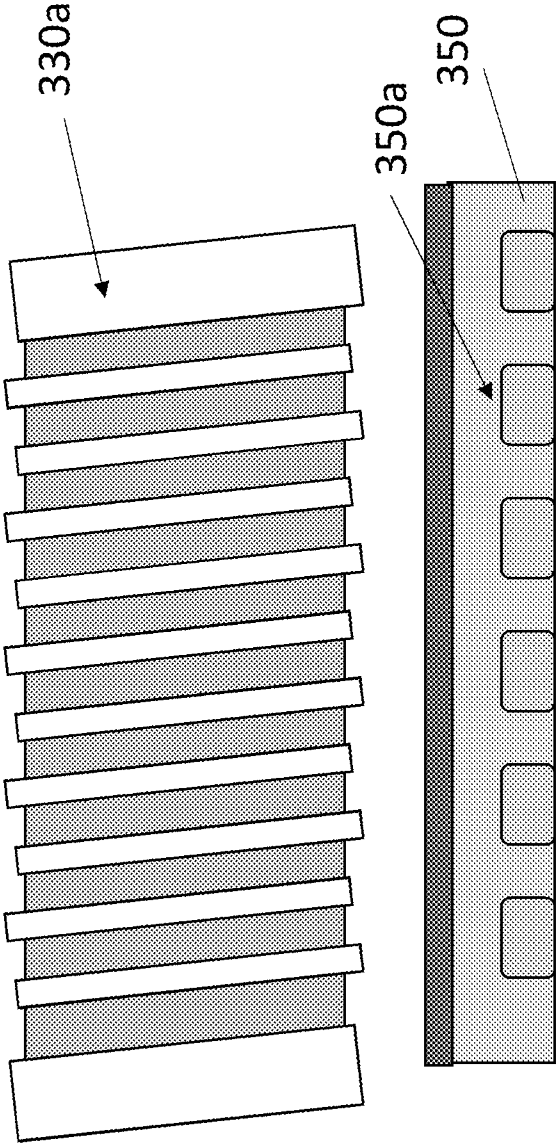
FIG. 6, in a schematic diagram, illustrates an exemplary many-to-one relationship of MCP microchannels to photodiodes, respectively.
Figure 7:
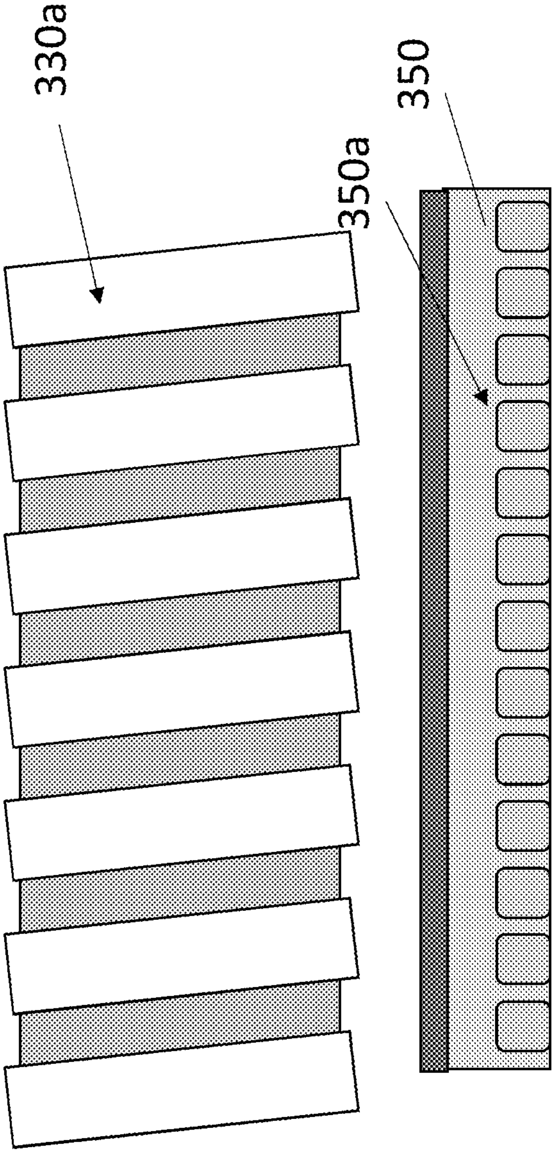
FIG. 7, in a schematic diagram, illustrates an exemplary many-to-one relationship of photodiodes to MCP microchannels, respectively.
Figure 8:
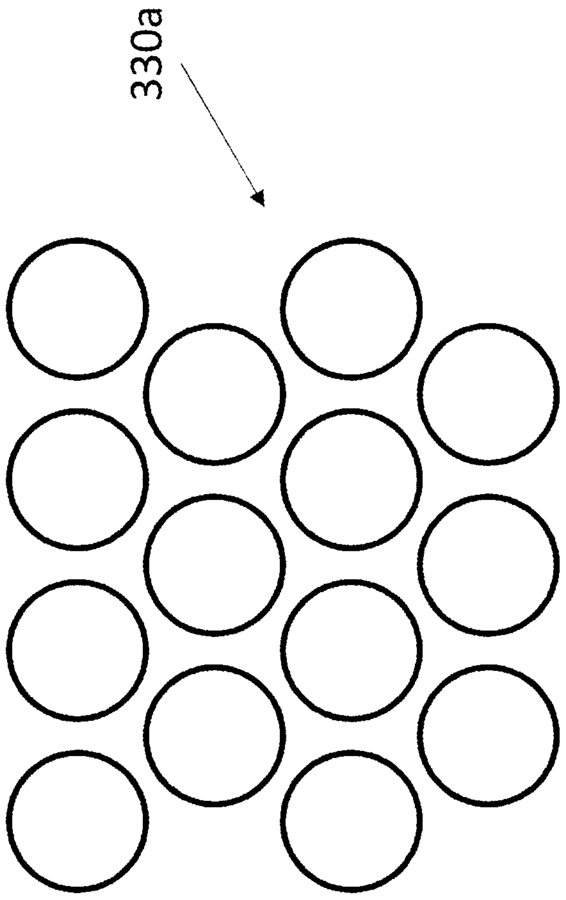
FIG. 8, in a schematic diagram, illustrates an exemplary hexagonal array arrangement of microchannels of an MCP.

The photodiodes 350*a* may also be arranged in a variety of patterns. By way of example, each of the photodiodes 350*a* may be associated with two or more of the microchannels 330*a* of the MCP 330 such that phosphorescent light generated from electrons generated from the two or more associated microchannels 330*a* is substantially detected by a single one of the photodiodes 350*a*, as depicted in FIG. 6, for example. In other examples, two or more of the photodiodes 350*a* may be associated with one of the microchannels 330*a* of the MCP 330 such that phosphorescent light generated from electrons generated from the one of the microchannels 330*a* is substantially detected by the two or more of the photodiodes 350*s*, as depicted in FIG. 7, for example. In some exemplary aspects, each photodiode 350*a* may exhibit a one-to-one correspondence with an individual microchannel, for example, as depicted in FIG. 3. For example, when the microchannels 330*a* of the MCP 330 are arranged in a hexagonal pattern, such as depicted in FIG. 8, for example, the photodiodes 350*a* may be similarly arranged and aligned therewith.

Figure 4:
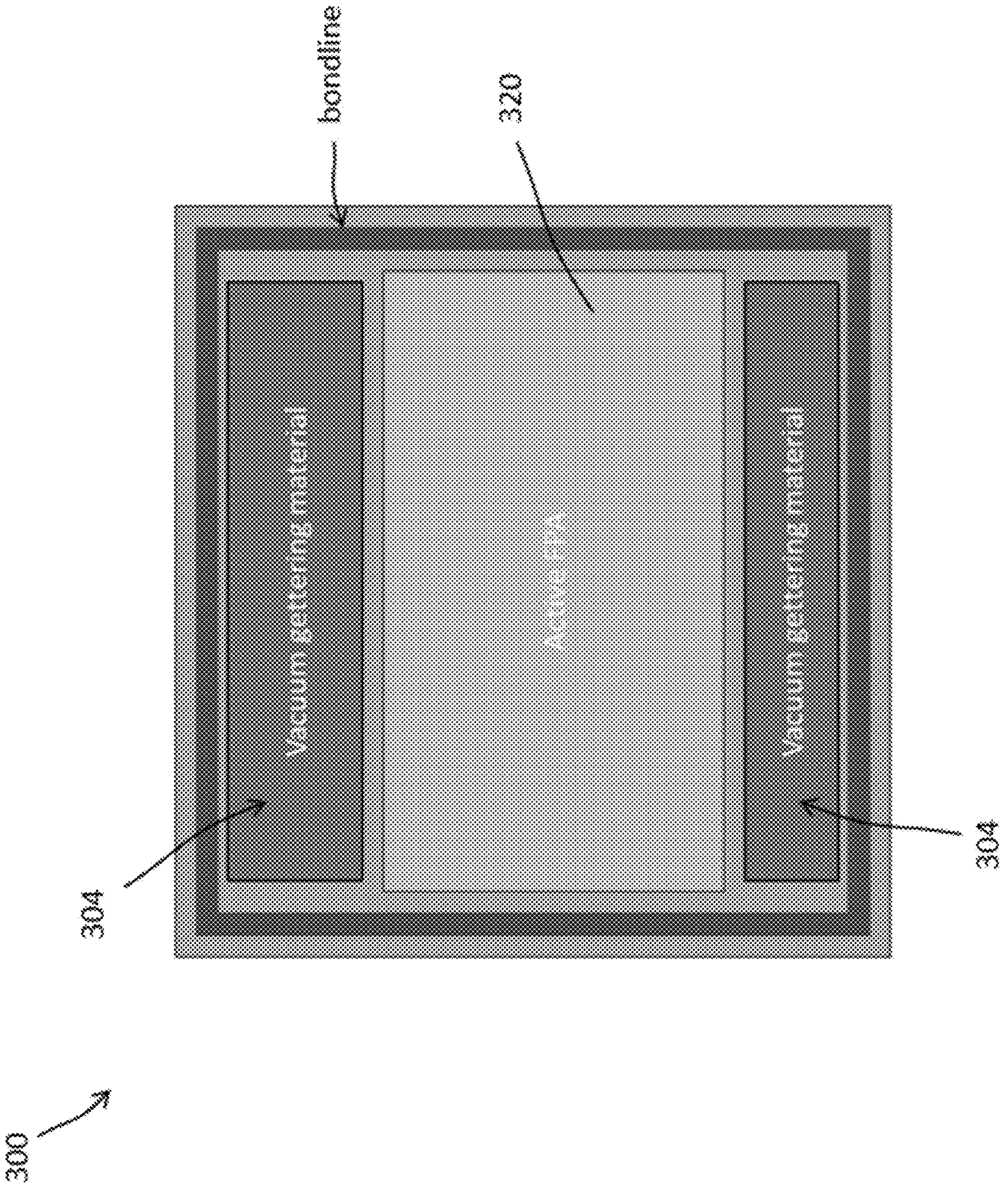
FIG. 4, in a schematic diagram, illustrates the top view of the image intensifier device of FIG. 3.

FIG. 4 represents a top view of the image intensifier device 300 of FIG. 3. As discussed otherwise herein, in some aspects a vacuum gettering material 304 can be provided within the seal (e.g., bond line) to help maintain a stable vacuum pressure within the vacuum cavity. As shown in FIG. 4, for example, the vacuum gettering material 304 can be disposed on the sides of the photocathode 320, for example, so as not to interfere with light (e.g., block) entering the front surface 310*a* of substrate 310 from impinging on the photocathode 320.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. An optoelectronic device, comprising:

a first substrate having a radiation-receiving first surface configured to receive electromagnetic radiation and an opposed second surface through which the received electromagnetic radiation can be transmitted;

a second substrate coupled to the first substrate so as to define a vacuum cavity therebetween wherein the second substrate comprises an imaging array comprising a plurality of photodiodes formed in the second substrate;

an electron emitting photocathode disposed within the vacuum cavity for generating electrons from electromagnetic radiation transmitted through the opposed second surface of the first substrate;

a microchannel plate at least partially disposed within the vacuum cavity, wherein the microchannel plate defines a plurality of microchannels extending from an input end to an output end, each of the plurality of microchannels is configured to generate a plurality of electrons in response to at least one electron generated by the electron emitting photocathode being received through the input end of the respective microchannel, and each of the plurality of photodiodes is associated with two or more of the plurality of microchannels or each of the plurality of microchannels is associated with two or more of the plurality of photodiodes; and a phosphorescent layer disposed within the vacuum cavity and adjacent the output ends of the plurality of microchannels, wherein the imaging array is configured to image one or more photons generated by the phosphorescent layer in response to the plurality of electrons transmitted by the output ends of the plurality of microchannels.

2. The optoelectronic device of claim 1, wherein each of the plurality of photodiodes is aligned with a respective one of the plurality of microchannels.

3. The optoelectronic device of claim 1, wherein the plurality of microchannels and the plurality of photodiodes is formed in a hexagonal array.

4. The optoelectronic device of claim 1, wherein the first substrate comprises glass.

5. The optoelectronic device of claim 1, wherein the electron emitting photocathode comprises gallium arsenide.

6. The optoelectronic device of claim 1, wherein the microchannel plate comprises a silicate glass having an electron emitting semiconducting layer deposited on a surface.

7. The optoelectronic device of claim 6, wherein the silicate glass comprises silicon dioxide, borosilicate, or aluminosilicate.

8. The optoelectronic device of claim 6, wherein a surface of each of the plurality of microchannels comprises a thin film having a composition different from the silicate glass.

9. The optoelectronic device of claim 8, wherein the thin film is generated via one of atomic layer deposition, chemical vapor deposition, reactive ion deposition, or reactive vapor evaporation.

10. The optoelectronic device of claim 8, wherein the thin film comprises lead oxide, cesium iodide, gallium arsenide, cadmium telluride, cadmium sulfide, indium phosphide, indium antimonide, germanium, silicon, or other group II-VI, group III-V, or group IV semiconductor.

11. The optoelectronic device of claim 1, wherein the phosphorescent layer is configured to generate photons having a wavelength in a range from about 500 nm to about 565 nm.

12. The optoelectronic device of claim 1, wherein the second substrate is disposed within a range of about 0.1 to 10 microns of the phosphorescent layer.

13. The optoelectronic device of claim 1, wherein the second substrate is in contact with the phosphorescent layer.

14. The optoelectronic device of claim 1, further comprising a micro-lens array disposed between the phosphorescent layer and the imaging array.

15. The optoelectronic device of claim 1, further comprising a micro-lens array associated with the radiation-receiving first surface of the first substrate for focusing light incident thereon.

16. The optoelectronic device of claim 1, wherein the vacuum cavity exhibits a pressure less than about 1×10-4 Torr.

17. The optoelectronic device of claim 16, wherein the pressure is less than or equal to about 1×10-6 Torr.

18. The optoelectronic device of claim 1, further comprising a vacuum gettering material disposed within the vacuum cavity.

19. The optoelectronic device of claim 1, wherein the imaging array comprises a complementary metal-oxide semiconductor (CMOS) imaging array.

20. The optoelectronic device of claim 1, wherein the imaging array comprises a plurality of backside-illuminated pixels.

21. The optoelectronic device of claim 20, wherein at least a portion of each of the plurality of backside-illuminated pixels includes a passivation coating on at least one surface, wherein the passivation coating comprises a dielectric material.

22. An optoelectronic device, comprising:

a first substrate having a radiation-receiving first surface configured to receive electromagnetic radiation and an opposed second surface through which the received electromagnetic radiation can be transmitted;

a second substrate coupled to the first substrate so as to define a vacuum cavity therebetween;

an electron emitting photocathode disposed within the vacuum cavity for generating electrons from electromagnetic radiation transmitted through the opposed second surface of the first substrate;

a microchannel plate at least partially disposed within the vacuum cavity, wherein the microchannel plate defines a plurality of microchannels extending from an input end to an output end and each of the plurality of microchannels is configured to generate a plurality of electrons in response to at least one electron generated by the electron emitting photocathode being received through the input end of the respective microchannel; and an imaging array comprising a plurality of photodiodes formed in the second substrate and configured to collect the plurality of electrons from the output end and produce a digital image, wherein each of the plurality of photodiodes is associated with two or more of the plurality of microchannels or each of the plurality of microchannels is associated with two or more of the plurality of photodiodes.

23. The optoelectronic device of claim 22, wherein each of the plurality of photodiodes is aligned with a respective one of the plurality of microchannels.

24. The optoelectronic device of claim 22, wherein the plurality of microchannels and the plurality of photodiodes is formed in a hexagonal array.

25. The optoelectronic device of claim 22, wherein the first substrate comprises glass.

26. The optoelectronic device of claim 22, wherein the electron emitting photocathode comprises gallium arsenide.

27. The optoelectronic device of claim 22, wherein the microchannel plate comprises a silicate glass having an electron emitting semiconducting layer deposited on a surface.

28. The optoelectronic device of claim 27, wherein the silicate glass comprises silicon dioxide, borosilicate, or aluminosilicate.

29. The optoelectronic device of claim 27, wherein a surface of each of the plurality of microchannels comprises a thin film having a composition different from the silicate glass.

30. The optoelectronic device of claim 29, wherein the thin film is generated via one of atomic layer deposition, chemical vapor deposition, reactive ion deposition, or reactive vapor evaporation.

31. The optoelectronic device of claim 29, wherein the thin film comprises lead oxide, cesium iodide, gallium arsenide, cadmium telluride, cadmium sulfide, indium phosphide, indium antimonide, germanium, silicon, or other group II-VI, group III-V, or group IV semiconductor.

32. An optoelectronic device, comprising:

a first substrate having a radiation-receiving first surface configured to receive electromagnetic radiation and an opposed second surface through which the received electromagnetic radiation can be transmitted;

a second substrate coupled to the first substrate so as to define a vacuum cavity therebetween, wherein the second substrate comprises an imaging array comprising a plurality of photodiodes formed in the second substrate;

an electron emitting photocathode disposed within the vacuum cavity for generating electrons from electromagnetic radiation transmitted through the opposed second surface of the first substrate;

a microchannel plate at least partially disposed within the vacuum cavity, wherein the microchannel plate defines a plurality of microchannels extending from an input end to an output end, each of the plurality of microchannels is configured to generate a plurality of electrons in response to at least one electron generated by the electron emitting photocathode being received through the input end of the respective microchannel, and each of the plurality of photodiodes is aligned with a respective one of the plurality of microchannels; and a phosphorescent layer disposed within the vacuum cavity and adjacent the output end of the plurality of microchannels, wherein the imaging array is configured to image one or more photons generated by the phosphorescent layer in response to receiving the plurality of electrons transmitted by the output end of the plurality of microchannels.

33. The optoelectronic device of claim 32, wherein the microchannel plate comprises a silica glass having an electron emitting semiconducting layer deposited on a first surface thereof and each of the plurality of microchannels comprise a thin film formed on a second surface thereof.

34. The optoelectronic device of claim 32, wherein each of the plurality of photodiodes is associated with two or more of the plurality of microchannels or each of the plurality of microchannels is associated with two or more of the plurality of photodiodes.

35. An optoelectronic device, comprising:

a first substrate having a radiation-receiving first surface configured to receive electromagnetic radiation and an opposed second surface through which the received electromagnetic radiation can be transmitted;

a second substrate coupled to the first substrate so as to define a vacuum cavity therebetween;

an electron emitting photocathode disposed within the vacuum cavity for generating electrons from electromagnetic radiation transmitted through the opposed second surface of the first substrate;

a microchannel plate at least partially disposed within the vacuum cavity, wherein the microchannel plate defines a plurality of microchannels extending from an input end to an output end and each of the plurality of microchannels is configured to generate a plurality of electrons in response to at least one electron generated by the electron emitting photocathode being received through the input end of the respective microchannel; and an imaging array comprising a plurality of photodiodes formed in the second substrate, aligned with a respective one of the plurality of microchannels, and configured to collect the plurality of electrons from the output end of the microchannel plate and produce a digital image.

36. The optoelectronic device of claim 35, wherein each of the plurality of photodiodes is associated with two or more of the plurality of microchannels or each of the plurality of microchannels is associated with two or more of the plurality of photodiodes.

37. The optoelectronic device of claim 35, wherein the plurality of microchannels and the plurality of photodiodes is formed in a hexagonal array.

38. The optoelectronic device of claim 35, wherein the first substrate comprises glass.

39. The optoelectronic device of claim 35, wherein the electron emitting photocathode comprises gallium arsenide.

40. The optoelectronic device of claim 35, wherein the microchannel plate comprises a silicate glass having an electron emitting semiconducting layer deposited on a surface.

41. The optoelectronic device of claim 40, wherein the silicate glass comprises silicon dioxide, borosilicate, or aluminosilicate.

42. The optoelectronic device of claim 40, wherein a surface of each of the plurality of microchannels comprises a thin film having a composition different from the silicate glass.

43. The optoelectronic device of claim 42, wherein the thin film is generated via one of atomic layer deposition, chemical vapor deposition, reactive ion deposition, or reactive vapor evaporation.

44. The optoelectronic device of claim 42, wherein the thin film comprises lead oxide, cesium iodide, gallium arsenide, cadmium telluride, cadmium sulfide, indium phosphide, indium antimonide, germanium, silicon, or other group II-VI, group III-V, or group IV semiconductor.

* * * * *